(12) United States Patent
Chandrashekar et al.

(10) Patent No.: US 11,924,479 B2
(45) Date of Patent: Mar. 5, 2024

(54) SYSTEMS AND METHODS FOR GENERATING METADATA FOR A LIVE MEDIA STREAM

(71) Applicant: Rovi Guides, Inc., San Jose, CA (US)

(72) Inventors: Padmassri Chandrashekar, Karnataka (IN); Daina Emmanuel, Bangalore (IN); Harshavardhan Reddy Kalathuru, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/369,027

(22) Filed: Jul. 7, 2021

(65) Prior Publication Data

US 2023/0011793 A1 Jan. 12, 2023

(51) Int. Cl.
*H04N 21/2187* (2011.01)
*G06F 40/30* (2020.01)
*G06F 40/40* (2020.01)
*G06V 20/40* (2022.01)
*G06V 40/10* (2022.01)
*G06V 40/16* (2022.01)
*H04N 21/232* (2011.01)
*H04N 21/235* (2011.01)
*H04N 21/258* (2011.01)
*H04N 21/83* (2011.01)
*G10L 15/18* (2013.01)

(52) U.S. Cl.
CPC ......... *H04N 21/2187* (2013.01); *G06F 40/30* (2020.01); *G06F 40/40* (2020.01); *G06V 20/41* (2022.01); *G06V 40/10* (2022.01); *G06V 40/161* (2022.01); *G06V 40/168* (2022.01); *G06V 40/172* (2022.01); *H04N 21/232* (2013.01); *H04N 21/235* (2013.01); *H04N 21/25891* (2013.01); *H04N 21/83* (2013.01); *G10L 15/1815* (2013.01)

(58) Field of Classification Search
CPC ............. H04N 21/2187; H04N 21/232; H04N 21/235; H04N 21/25891; H04N 21/83; G06F 40/30; G06F 40/40; G06V 20/41; G06V 40/10; G06V 40/161; G06V 40/168; G06V 40/172; G10L 15/1815
See application file for complete search history.

(56) References Cited

U.S. PATENT DOCUMENTS

| | | | |
|---|---|---|---|
| 11,122,148 B1 | 9/2021 | Kumar et al. | |
| 2013/0117692 A1* | 5/2013 | Padmanabhan | G06K 9/6217 715/753 |
| 2016/0277802 A1* | 9/2016 | Bernstein | H04N 21/4325 |
| 2019/0163752 A1* | 5/2019 | Barlaskar | G06F 16/7837 |
| 2021/0034661 A1 | 2/2021 | Pande et al. | |
| 2021/0352336 A1* | 11/2021 | Qiao | H04L 65/611 |

* cited by examiner

*Primary Examiner* — Alazar Tilahun
(74) *Attorney, Agent, or Firm* — HALEY GUILIANO LLP

(57) ABSTRACT

Systems and methods are described to dynamically generate metadata for a live media stream. The system determines that a first user on a social media network has started a live media stream. In response, the system identifies a topic of the live media stream based on a frame of the live media stream and identifies another person featured in the frame of the live media stream based on social connections of the first user in the social media network. The system then generates a title for the live media stream based on the identified topic and the identified person, and transmits a notification to a second user that the first user is streaming live, where the notification includes the generated title.

15 Claims, 9 Drawing Sheets

SYSTEMS AND METHODS FOR GENERATING METADATA FOR A LIVE MEDIA STREAM

BACKGROUND

This disclosure is directed to automatically generating a metadata (e.g., a title for a live media stream). Specifically, techniques are disclosed for generating a title based on identifying a topic for the live media stream and a person featured in the live media stream. In addition, techniques are disclosed for selectively transmitting a notification to potential viewers of the live media stream based on their respective viewing patterns.

SUMMARY

Modern media distribution systems enable users to access more media content than ever before. With such a large amount of content at a user's fingertips, it may be difficult for content creators to provide their audience with correct information about contents of the media content (e.g., to enable the audience to find their content). In particular, a number of social media networks allow content creators to stream live content, which is available for consumption by the users of the social media networks immediately. In one approach, social media networks may make use of media consumption data associated with users of the social media networks (e.g., a user's subscription activity related to a particular content creator) to determine whether the user is likely to enjoy the live content being streamed by the content creators. The social media networks can then identify the likely audience for the live media stream and push a notification of the start of the live media stream to the likely audience. However, in such an approach, the likely audience (i.e., other users on the social media networks that are likely to enjoy the live media stream) receives a notification only that a particular content creator is starting a live media stream, without any additional information about the content being streamed. Moreover, because of the contemporaneous nature of live media streams, the content creator often does not have the option to provide sufficient information about the content of the live media stream. Therefore, the notifications typically generated for live media streams only indicate the start of the live media stream without any additional information. These notifications typically fail to engage the likely audience at the time the content is being streameds thereby lowering the viewership for the live media stream. Moreover, users of the social media network who may be interested in a particular topic being discussed in the live media stream will likely not be notified of the start of the live media stream because of the lack of information about the content being discussed in the live media stream. These users have to manually search for live media streams that match their preferences, which wastes time, computing resources, and bandwidth due to a lack of good metadata available for live media streams. For example, request for streams that are not of interest to the user as the user is searching for a stream of interests unnecessarily consume limited available bandwidth.

To overcome these problems, systems and methods are provided herein for dynamically generating metadata (e.g., a title) for a live media stream that is targeted to the likely audience in order to increase engagement and viewership. More particularly, when the system determines that a first user on a social media network has started a live media stream, the system identifies a topic of the live media stream based on a frame of the live media stream. For example, the frame may be analyzed to identify a location from which the content is being streamed. The system also identifies another person featured in the frame of the live media stream. For example, the system may identify the other person based on finding a match from social connections of the first user in the social media network. The system then generates metadata, such as a title, for the live media stream based on the identified topic and the identified person.

Such aspects enable the system to dynamically generate metadata (e.g., a title, description, genre) on the fly as a user starts the live media stream. The generated metadata includes the topic for the live media stream as well as identification of another person in the live media stream, which increases the engagement with the likely audience and the viewership for the live media stream. In some embodiments, the generated metadata can include a location where the first user is streaming from based on an analysis of the frame. For example, when the first user begins a live media stream from a baseball game, systems and methods disclosed here may generate a title that includes the names of the teams playing the baseball game in addition to the names of the identified persons in the live media stream (e.g., a celebrity who may also be attending the baseball game). In addition, the generated metadata can include the location of the baseball stadium. Including this information in the notification that is sent to the likely audience increases the likelihood that people who are interested in the baseball teams or the person in the live media stream will be able to find and watch the live media stream. Thus, systems and methods described herein increase the likelihood that the live media stream will be watched by more people on the social media network. In some embodiments, the above-described methods and systems for dynamically generating metadata can be applied to other streaming content that lacks suitable metadata (e.g., metadata allowing likely viewers to easily find streaming content of interest).

In addition, systems and methods are provided herein for notifying a second user of the live media stream by determining, based on a live media consumption profile of the second user, whether the second user is likely to join the live media stream at a time after the start of the live media stream. For example, the system retrieves a history of previous live media streams watched by the second user and determines an average time after the start of those live media streams that the second user began watching those live media streams. In response to determining that the second user is likely to join the live media stream at a time after the start of the live stream, the transmission of the notification is delayed until additional frames of the live media stream has been received from the first user. This allows for the metadata to be generated based on additional information about the content of the live media stream gathered from additional frames of the live media stream and identify a more relevant topic for the live media stream. Since the second user is more likely to join the live media stream after the start of the live media stream (e.g., after a few hours or even the next day), delaying the notification does not deter the second user from watching the live media stream. The notification is then transmitted to the second user after the additional frames of the live media stream have been received to ensure a more accurate title.

On the other hand, when the system identifies a third user who is likely to join the live media stream immediately at the start of the live media stream based on the live media consumption profile of the third user, the metadata is generated based only on the initial frame received at the start of the live media stream and transmitted upon the start of the live media stream. Because the third user is more likely to join the live media stream at the start of the live media stream, transmitting the notification to the third user immediately at the start of the live media stream is of more importance than waiting for additional frames in order to generate more accurate metadata (e.g., a title).

Methods and systems are provided herein for, in some embodiments, segmenting a likely audience for the live media stream started by the first user. In such embodiments, the system retrieves viewing statistics associated with prior live media streams started by the first user. A first segment of viewers who are likely to join the live media stream at the start of the live media stream are identified, based on the retrieved viewing statistics, and a second segment of viewers who are likely to join the live media stream after a delay from the start of the live media stream are identified based on the retrieved viewing statistics. The notification to each of the first and second segments can be tailored based on their respective live media stream consumption profiles. Specifically, the notification to the first segment of viewers is transmitted at the start of the live media stream, where the notification does not include the generated metadata, while the notification to the second segment of viewers is transmitted after a delay from the start of the live media stream and includes the generated metadata (e.g., a title).

In some aspects of this disclosure, identifying another person featured in the frame of the live media stream based on social connections of the first user in the social media network includes retrieving images of each of the social connections of the first user in the social media network. The system then obtains a respective set of features from each of the retrieved images of each of the social connections of the first user and compares them to a face identified from the received frame of the live media stream. As discussed above, the identity of the person is included in the generated metadata, which attracts potential viewers who are interested in the identified person.

In some aspects, identifying the topic of the live media stream based on a frame of the live media stream includes retrieving metadata associated with prior live media streams started by the first user, where the metadata includes subtitle data, and determining the topic of the live media stream based on an analysis of the retrieved subtitle data. For example, if the first user primarily discusses baseball games in their prior live media streams, the system determines that the topic of the current live media stream is also likely to be related to baseball. In such aspects, the system may also factor in additional variables (e.g., location, time of day, etc.) when determining the topic. For example, the received frame of the live media stream is analyzed to identify a location from which the live media stream was started.

In some aspects of this disclosure, the generated metadata associated with the live media stream is intermittently updated based on receipt of additional frames of the live media streams. Live media streams can often have multiple topics discussed during the duration of the stream. Similarly, the first user can often change locations during a live media stream. Dynamically updating the metadata of the live media stream gives viewers joining after the start of the live media stream additional information about the content of the live media stream.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
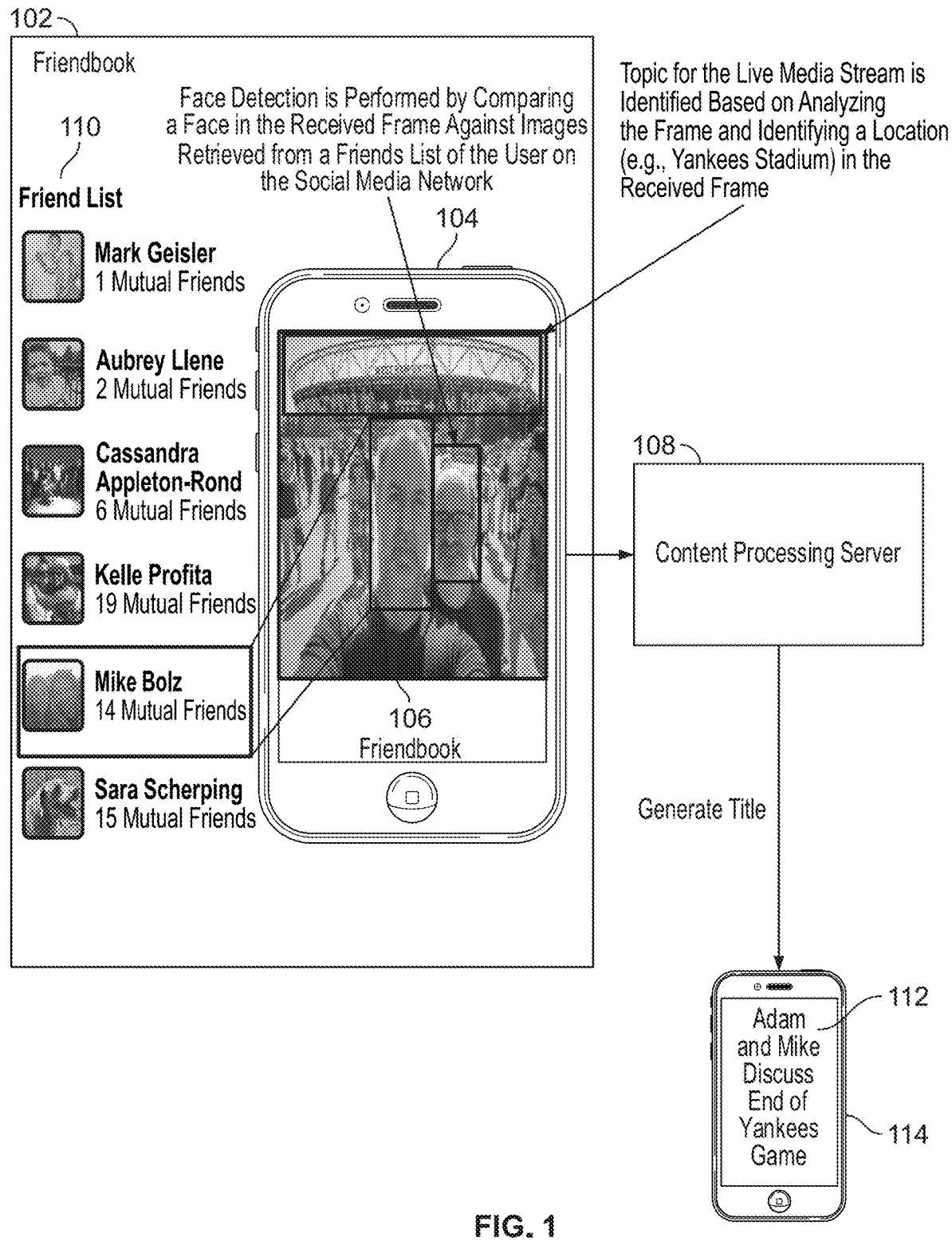
FIG. 1 shows an illustrative system for dynamically generating metadata for a live media stream, in accordance with some embodiments of this disclosure.

FIG. 1 shows an exemplary system 100 for automatically generating metadata (e.g., a title, description, genre, location, etc.) for a live media stream started on a social media network 102. As discussed above, in one approach, social media networks, upon the start of a live media stream by a first user, Adam, transmit a notification to social connections of the first user on the social media network informing them of the start of the live media stream. An example notification under such approaches typically states "Adam has started a live stream." However, such a generic notification does not provide any information about the content of the live media stream and is therefore unlikely to get social connections of the first user to watch the live media stream. Methods and systems described herein dynamically generate metadata for the live media stream that are more likely to engage other users of the social media network and bring more suitable viewers (e.g., viewers whose profiles match the generated metadata) to the live media stream.

As illustrated in FIG. 1, a first user, for example, Adam, begins a live media stream on the social media network 102 using a mobile device 104 on which an application for the social media network 102 is installed. A first frame 106 of the live media stream is transmitted to a content processing server 108. Content processing server 108 may be a server of social media network 102, in accordance with one embodiment. In another embodiment, content processing server 108 is a third-party server receiving and transmitting data streams via social media network 102.

Content processing server 108 analyzes the received frame 106 (or several frames) of the live media stream to identify a topic of the live media stream. In one embodiment, content processing server 108, when identifying the topic of the live media stream, analyzes the frame 106 to identify any geographic landmark within frame 106 (e.g., a baseball stadium) in addition to the geographic location and/or the time at which the live media stream was started. In another embodiment, content processing server 108 can use an image processor (e.g., image processor 215 as described below in connection with FIG. 2) to retrieve features included in the received frame 106 and compare the retrieved features to features retrieved from a catalog of images of geographic landmarks in the vicinity of the first user. In still another embodiment, content processing server 108 can use a natural language processor (e.g., natural language processor 214 as described below in connection with FIG. 2) to analyze audio data associated with frame 106 to determine a topic for the live media stream.

Content processing server 108 then determines a topic for the current live media stream started by the first user based on the information retrieved from frame 106 of the live media stream. In the example illustrated in FIG. 1, content processing server 108 determines the topic for the live media stream to be "the end of the Yankees game" based on identifying the Yankee Stadium in frame 106 and the time and location at which the live media stream was started.

In another embodiment, content processing server 108 can retrieve metadata for previous live media streams started by the first user to determine the topics frequently discussed by the first user during the prior live media streams. For example, content processing server 108 can determine that the first user often discusses the end of baseball games they attend. Content processing server 108 can then identify a topic of the current live media stream based on the location of the first user (e.g., Yankee Stadium) and retrieved metadata from previous live media streams started by the first user.

As further illustrated in FIG. 1, content processing server 108 identifies another person featured in the frame of the live media stream based on social connections of the first user in social media network 102. In some embodiments, content processing server 108 retrieves images of each of the social connections of the first user on social media network 102. For example, images of each of the social connections of the first user can be retrieved from a friend list 110 available on social media network 102. In another embodiment, content processing server 108 can retrieve images of each of the users in the vicinity of the first user by using geolocation data available for all users. In still another embodiment, content processing server 108 can search through images over the Internet to identify a match. The retrieved images are then compared to facial features found in frame 106. In one embodiment, content processing server 108 can obtain a respective set of features from each of the retrieved images and compare them against a set of features obtained from frame 106 to identify a match. Upon identifying a match, content processing server 108 generates metadata for the live media stream based on the identified person. As illustrated in FIG. 1, content processing server 108 identifies a social connection of the first user, "Mike Bolz," that matches a face identified in frame 106 of the live media stream.

In other embodiments, content processing server 108 can use additional databases to obtain candidate images to be compared to a face in frame 106 of the live media stream. For example, content processing server 108 can search through public databases to identify a celebrity image that matches a face in frame 106 of the live media stream.

Content processing server 108 then generates metadata for the live media stream. In one embodiment, the generated metadata is a title for the live media stream that includes both the identified person and the determined topic for the live media stream. As illustrated in the example shown in FIG. 1, content processing server 108 generates a title "Adam and Mike Discuss End of Yankees Game" for the live media stream. In other embodiments, the generated metadata can include information such as the location at which the first user started the live media stream.

Content processing server 108 then transmits a notification to a second user on the social media network where the notification includes the generated metadata. For example, as illustrated in FIG. 1, notification 112 is a title for the live media stream including text "Adam and Mike Discuss End of Yankees Game." Notification 112 is transmitted to mobile device 114 of a second user. In an embodiment, the second user is one of the social connections of the first user on social media network 102. In other embodiments, the second user is a user of the social media network but is not a social connection of the first user. Specifically, content processing server 108 identifies a target audience comprising users on social media network 102 that the live media stream would be of interest to. Content processing server 108 identifies the target audience by retrieving media consumption profiles of the users of social media network 102 to determine whether there is a match between the interests of the users of social media network 102 and the generated metadata. Notification 112 is then transmitted to the user equipment devices (e.g., a mobile phone) of the target audience.

In various aspects, content processing server 108 can generate additional metadata for the live media stream. In one such aspect, content processing server 108 generates a poster icon for the live media stream to be used as a thumbnail for the live media stream. Content processing server 108 samples various segments of the live media stream (e.g., a first, a middle, and a last segment of frames) to determine a representative poster icon. In one embodiment, frames of the live media stream featuring multiple faces are sampled when creating the poster icon for the live media stream. In another aspect, content processing server 108 generates the poster icon based on the preferences of a second user likely to watch the live media stream. For example, content processing server 108 identifies frames that are most likely to be of interest to the second user based on a media consumption profile of the second user. Content processing server 108 generates the poster icon by creating a collage of the sampled frames of the live media stream.

In another aspect, content processing server 108 analyzes subtitle data associated with the live media stream to determine a genre for the live media stream. In another embodiment, content processing server 108 analyzes video frames of the live media stream to determine a genre for the live media stream. For example, the genre of the live media stream can be determined by determining a frequency of words, phrases, or entities uttered during the live media stream. As will be described in greater detail below in connection with discussion of FIG. 2, content processing server 108 also determines identities of the people featured in the live media stream to generate metadata listing the characters appearing in the live media stream.

In addition to providing information about the content of the live media stream at the time the first user begins the live media stream, the generated metadata also allows other users to find the live media stream more efficiently. In some embodiments, users of the social media network are able to identify live media streams that are of interest by inputting search terms matching the generated metadata. For example, a user can enter a search term "Yankees." The metadata generated by content processing server 108 in accordance with the methods and systems described above allow for the search term "Yankees" to be correlated to the live media stream (e.g., based on the generated title or description as discussed above).

Figure 2:
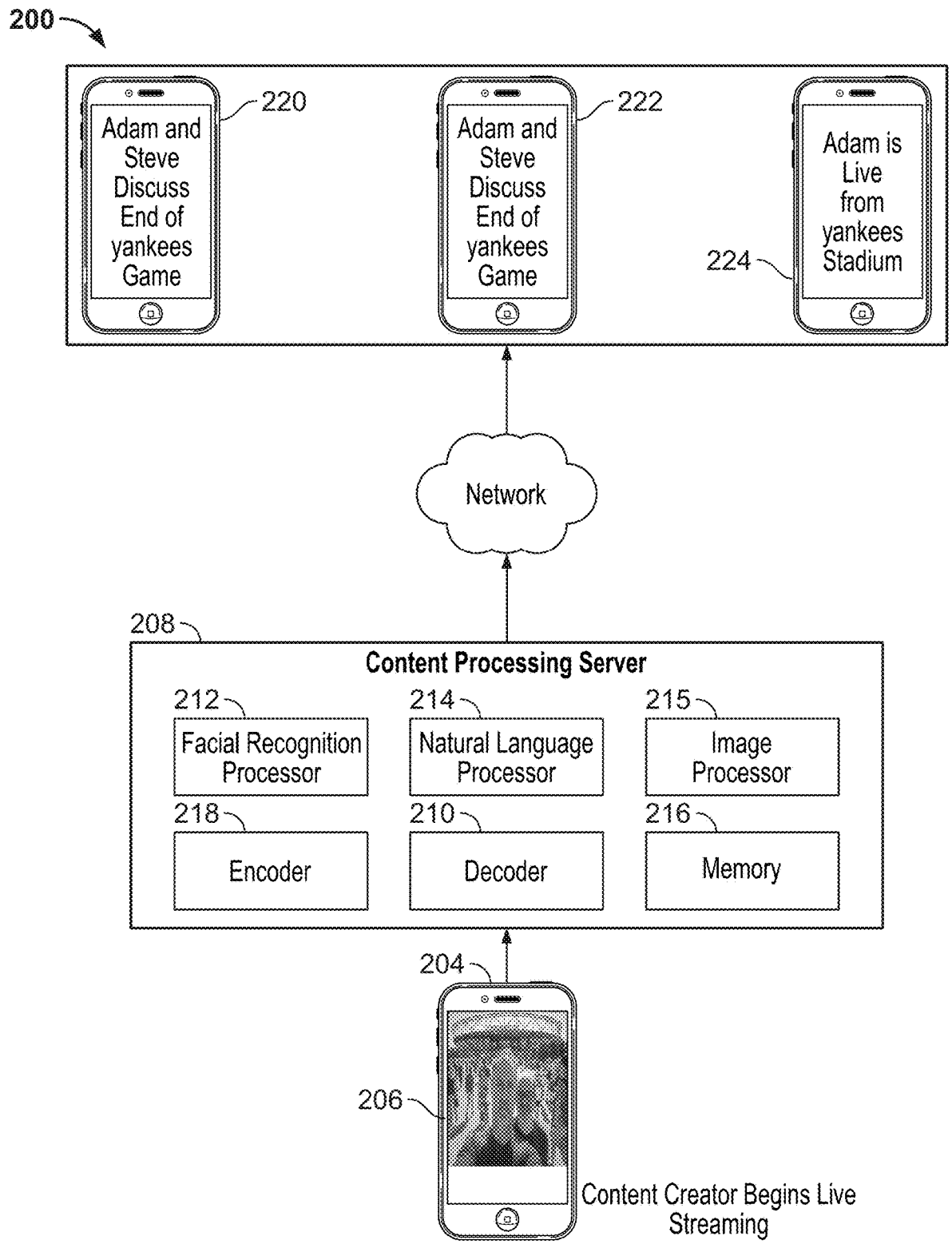
FIG. 2 shows a block diagram of an illustrative system for dynamically generating metadata for a live media stream, in accordance with some embodiments of this disclosure.

FIG. 2 shows a block diagram of an illustrative system 200 for dynamically generating metadata for a live media stream by content processing server 208. Content processing server 208 may be based on any suitable processing circuitry such as processing circuitry 306 (discussed below in greater detail in connection with FIG. 3). Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, content processing server 208 executes instructions for an application stored in memory (e.g., memory 216). Specifically, content processing server 208 may be instructed by a media application to perform the functions discussed above and below. For example, the media application may provide instructions to content processing server 208 to generate metadata for the live media stream. Moreover, the media application may also collect audience preference information and generate a suitable notification. In some implementations, any action performed by content processing server 208 may be based on instructions received from the media application.

The first user (i.e., content creator) can use user equipment device 204 (e.g., a mobile phone) to start a live media stream. Frame 206 of the live media stream is transmitted from user equipment device 204 to content processing server 208. More particularly, a data packet containing frame 206 (or a plurality of frames) and associated audio data are transmitted from a transceiver of user equipment device 204. The data packet is received at a receiver (not shown) of content processing server 208. Decoder 210 of content processing server 208 decodes the received data packet to retrieve the received frame 206 and associated audio data. Content processing server 208 next begins analysis of the received frame 206 and the associated audio data.

Specifically, facial recognition processor 212 identifies a person included in the received frame 206. In an embodiment, content processing server 208 retrieves images of each of the social connections of the first user on social media network 102 and stores them in memory 216. As discussed above, images of each of the social connections of the first user can be retrieved from a friend list 110 available on social media network 102. Facial recognition processor 212 then compares the retrieved images to facial features found in frame 206. In one embodiment, facial recognition processor 212 obtains a respective set of features from each of the retrieved images. Facial recognition processor 212 then compares each of the respective set of features against a set of features obtained from frame 206 to identify a match. Upon identifying a match, content processing server 208 generates metadata for the live media stream based on the identified person.

Moreover, content processing server 208 identifies a topic for the live media stream using one or more of natural language processor 214, image processor 215, and data retrieved from memory 216. Natural language processor 214 analyzes the audio data received from user equipment device 204. In an embodiment, content processing server 208 identifies a topic for the live media stream based on an output from natural language processor 214. For example, if natural language processor 214 determines that the first user uttered the phrase "Go Yankees," content processing server 208 identifies baseball as a candidate topic for the live media stream.

Image processor 215 analyzes frame 206 to identify any geographic landmark within frame 206 (e.g., a baseball stadium), in accordance with an embodiment. For example, image processor 215 can obtain a set of features of an architecture within frame 206 and compare those features against publicly available images of various architecture to identify a match. In additional embodiments, image processor 215 retrieves geographic location information and/or information about the time at which the live media stream was started. In one embodiment, the information about the geographic location and/or the time can be retrieved from a header of the received data packet from user equipment device 204.

In another embodiment, content processing server 208 can retrieve from memory 216 metadata for previous live media streams started by the first user to determine the topics frequently discussed by the first user during the prior live media streams. For example, content processing server 208 can determine that the first user often discusses the end of baseball games they attend. Content processing server 208 then identifies a topic of the current live media stream based on the location of the first user (e.g., Yankee Stadium) and retrieved metadata from previous live media streams started by the first user in accordance with one embodiment.

Content processing server 208 then generates metadata for the live media stream based on the identified topic and person within frame 206. In one embodiment, the generated metadata is a title generated for the live media stream that includes both the identified topic and the name of the identified person. The generated metadata is then encoded using encoder 218 and is transmitted from content processing server 208 to a plurality of user equipment devices 220, 222, 224 associated with users on social media network 102 that are likely to be interested in the live media stream. More particularly, content processing server 208 transmits a notification to user equipment devices 220, 222, 224 notifying the users of the start of the live media stream. Upon selection of the live media stream by the users on their respective user equipment devices 220, 222, 224, content processing server 208 begins transmitting frames of the live media stream to the respective user equipment devices 220, 222, 224.

In an embodiment, content processing server 208 retrieves viewing statistics associated with prior live media streams started by the first user from memory 216. Content processing server 208 then determines a first segment of viewers who are likely to join the live media stream at the start of the live media stream based on the retrieved viewing statistics, and determines a second segment of viewers who are likely to join the live media stream after a delay from the start of the live media stream based on the retrieved viewing statistics. More particularly, users who have previously joined live media streams started by the first user at the very beginning of those streams are added to the first segment of viewers while users who have previously joined live media streams started by the first user after a delay from the start of those streams (e.g., after a few hours or days) are added to the second segment of viewers. Content processing server 208 then generates different metadata to be sent to the two segments of viewers based on their live media stream viewing behaviors.

Specifically, users in the second segment of viewers do not need to be notified of the start of live media stream immediately as they are less likely to watch the live media stream at the start time. Content processing server 208 leverages this data and waits to generate metadata until additional frames of the live media stream are received from user equipment device 204 in order to generate more accurate metadata. On the other hand, content processing server 208 prioritizes expediency over accuracy when generating metadata for users belonging in the first segment of viewers. The notification transmitted to users in the first segment therefore includes less information (see, e.g., notifications received on user equipment device 224) than notification transmitted to users in the second segment (see, e.g., notifications received on user equipment devices 220, 222). Accordingly, methods and systems described herein dynamically generate a title that includes information about the content of the live media stream and is tailored to the viewing behavior of the target audience for the live media stream.

Figure 3:
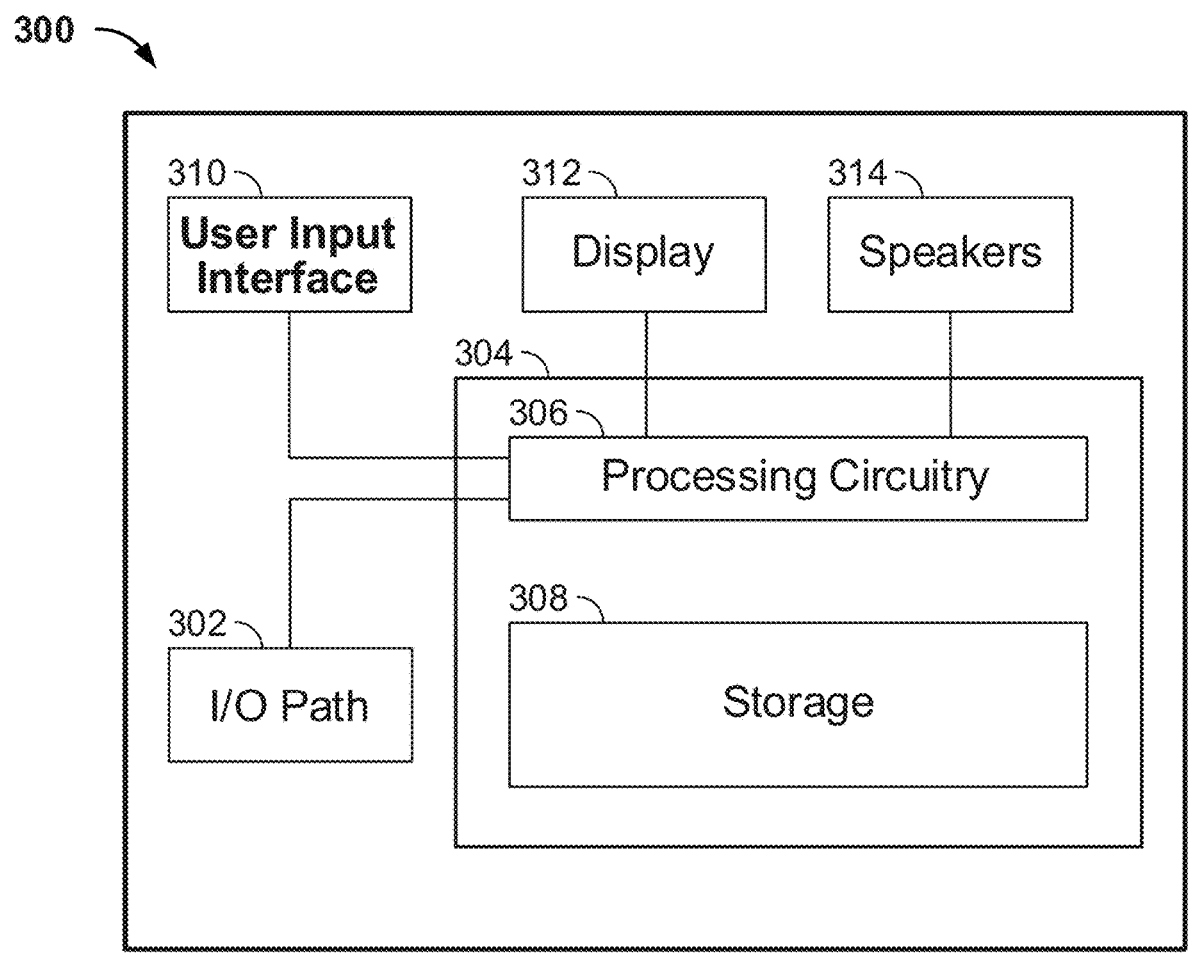
FIG. 3 shows a block diagram of an illustrative user equipment device used to begin a live media stream, in accordance with some embodiments of the disclosure.

FIG. 3 depicts a generalized embodiment of an illustrative device (e.g., user equipment device 204 or user equipment device 220) that is used to start or watch a live media stream. User equipment device 300 may be any of a plurality of user devices such as a smartphone, a tablet, personal computer, etc. (discussed further below with respect to FIG. 4). User equipment device 300 may transmit or receive the live media stream data via input/output (hereinafter "I/O") path 302. I/O path 302 may provide the live media stream data (e.g., content item available over LAN or WAN, and the like) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below in relation to FIG. 4). I/O functions may be provided by one or more of these communications paths but are shown as a single path in FIG. 3 to avoid overcomplicating the drawing.

Control circuitry 304 may be based on any suitable processing circuitry such as processing circuitry 306. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 304 executes instructions for an application stored in memory (e.g., memory 308). Specifically, control circuitry 304 may be instructed by a media application to perform the functions discussed above and below. For example, the media application may provide instructions to control circuitry 304 to generate metadata for the live media stream. Moreover, the media application may also collect audience preference information and generate a suitable notification. In some implementations, any action performed by control circuitry 304 may be based on instructions received from the media application.

Control circuitry 304 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in memory 308) may also be provided. Control circuitry 304 may also include scaler circuitry for upconverting and downconverting content item into the preferred output format of user equipment device 300, and converter circuitry for converting between digital and analog signals. The tuning and encoding circuitry may be used by user equipment device 300 to receive, play, and buffer content item. The circuitry described herein, including for example, the tuning, audio generating, encoding, decoding, encrypting, decrypting, scaler, and analog/digital circuitry, may be implemented using software running on one or more general purpose or specialized processors. If storage 308 is provided as a separate device from user equipment device 300, the tuning and encoding circuitry may be associated with storage 308.

Storage 308 may be any device for storing electronic data, such as random-access memory, solid state devices, quantum storage devices, hard disk drives, non-volatile memory or any other suitable fixed or removable storage devices, and/or any combination of the same. Control circuitry 304 may allocate portions of storage 308 for various purposes such as caching application instructions, recording media assets, storing portions of a media asset, buffering segments of media, etc. As described herein, storage 308 may be used to store one or more LUTs storing a number of MAC addresses associated with a plurality of user equipment devices and their corresponding profile information.

A user may send instructions to control circuitry 304 using user input interface 310. User input interface 310 may be any suitable user input interface, such as a touchscreen as shown in FIG. 1, mouse, trackball, keypad, keyboard, touchpad, stylus input, joystick, voice recognition interface, or other user input interfaces. Instructions to control circuitry 304 may be transmitted through I/O path 302, that could consist of a video tracking and detection mechanism, Internet of Things (IoT) and home automation triggers, emergency alert systems, and software or hardware communication pipelines and/or notification centers.

Display 312 may be provided as a stand-alone device or integrated with other elements of each one of user equipment device 300. For example, display 312 may be a touchscreen or touch-sensitive display, a projector, or a casting device. In such circumstances, user input interface 310 may be integrated with or combined with display 312. Display 312 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 312. In some embodiments, the graphics processing circuitry may be external to processing circuitry 306 (e.g., as a graphics processing card that communicates with processing circuitry 306 via I/O path 302) or may be internal to processing circuitry 306 or control circuitry 304 (e.g., on a same silicone die as control circuitry 304 or processing circuitry 306). In some embodiments, the graphics processing circuitry may be used to receive, display, and play the media asset.

Speakers 314 may be provided as integrated with other elements of user equipment device 300 or may be stand-alone units. The audio component of videos and other media asset displayed on display 312 may be played through speakers 314. In some embodiments, the audio may be distributed to a receiver (not shown), which processes and outputs the audio via speakers 314. The speakers 314 may be part of, but not limited to, a home automation system. In some embodiments, speakers 314 may also include a microphone to receive audio input from the first user starting the live media stream.

The media application may be implemented using any suitable architecture. For example, it may be a stand-alone application wholly implemented on user equipment device 300. The user interface application and/or any instructions for performing any of the embodiments discussed herein may be encoded on computer-readable media. Computer-readable media includes any media capable of storing data.

Figure 4:
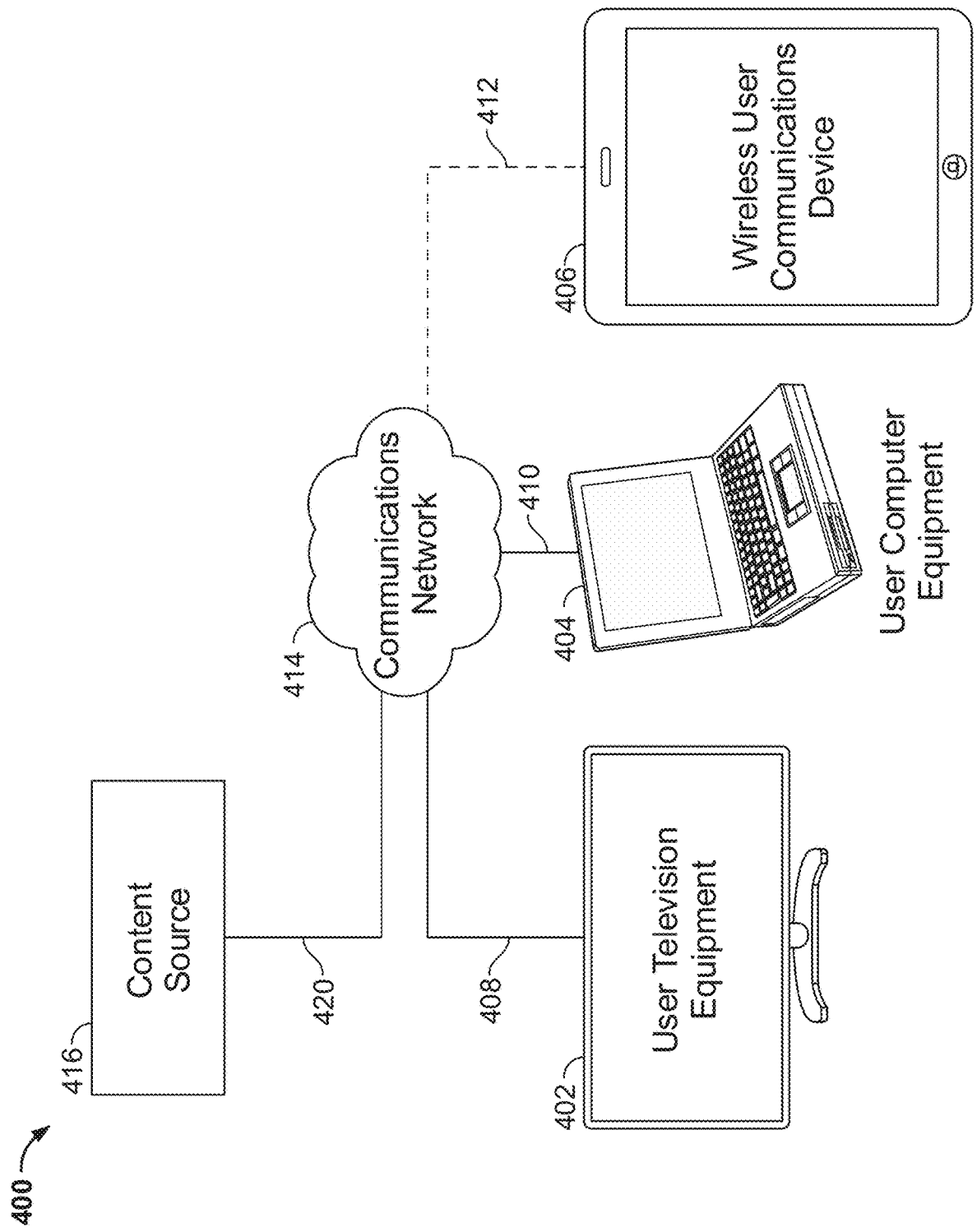
FIG. 4 shows a block diagram of an illustrative media system, in accordance with some embodiments of this disclosure.

FIG. 4 depicts an exemplary media system in accordance with some embodiments of the disclosure in which user equipment devices 204, 220, 222, 224 and user equipment device 300 can be implemented in system 400 of FIG. 4 as user television equipment 402, user computer equipment 404, wireless user communications device 406, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 402 may include circuitry for receiving content over the Internet, a television set, a digital storage device, or other user television equipment. One or more of these devices may be integrated to be a single device, if desired. User computer equipment 404 may include a PC, a laptop, a streaming content item aggregator, a PC media center, or other user computer equipment. It may include devices like digital assistance, smart speakers, and/or home automation. Wireless user communications device 406 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 400, there is typically more than one of each type of user equipment but only one of each is shown in FIG. 4 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 414. Namely, user television equipment 402, user computer equipment 404, and wireless user communications device 406 are coupled to communications network 414 via communications paths 408, 410, and 412, respectively. Communications network 414 is used by the user equipment to transmit or receive the live media stream. Communications network 414 may be one or more networks including the Internet, a mobile phone network, ad-hoc network, a Local Area network (LAN), or other types of communications network or combination of communications networks. Paths 408, 410, and 412 may separately or together include one or more communications paths, including any suitable wireless communications path. Paths 408 and 410 are drawn as solid lines to indicate they are wireless paths and path 412 is drawn as dotted line to indicate it is a wired path. Communications with the user equipment may be provided by one or more of these communications paths but are shown as a single path in FIG. 4 to avoid overcomplicating the drawing. The user equipment devices may communicate with each other directly through an indirect path via communications network 414.

System 400 includes content item source 416 coupled to communications network 414 via communications path 420. Path 420 may include any of the communications paths described above in connection with paths 408, 410, and 412. Communications with the content item source 416 may be exchanged over one or more communications paths but are shown as a single path in FIG. 4 to avoid overcomplicating the drawing. In addition, there may be more than one of content item source 416, but only one is shown in FIG. 4 to avoid overcomplicating the drawing. Although communications between source 416 with user equipment 402, 404, and 406 are shown as through communications network 414, in some embodiments, source 416 may communicate directly with user equipment devices 402, 404, and 406 via communications paths (not shown) such as those described above in connection with paths 408, 410, and 412.

Content item source 416 may include one or more types of media distribution equipment such as a media server, cable system headend, satellite distribution facility, intermediate distribution facilities and/or servers, Internet providers, on-demand media servers, and other media providers. Content item source 416 may be the originator of media content item or may not be the originator of media content item. Content item source 416 may also include a remote media server used to store different types of media content item (including live media stream data (e.g., a plurality of frames) uploaded by a user), in a location remote from any of the user equipment.

System 400 is intended to illustrate a number of approaches, or network configurations, by which user equipment devices and sources of media content item and guidance data may communicate with each other for the purpose of accessing media and data related to the media. The configuration of the devices and paths in system 400 may change without departing from the scope of the present disclosure.

Figure 5:
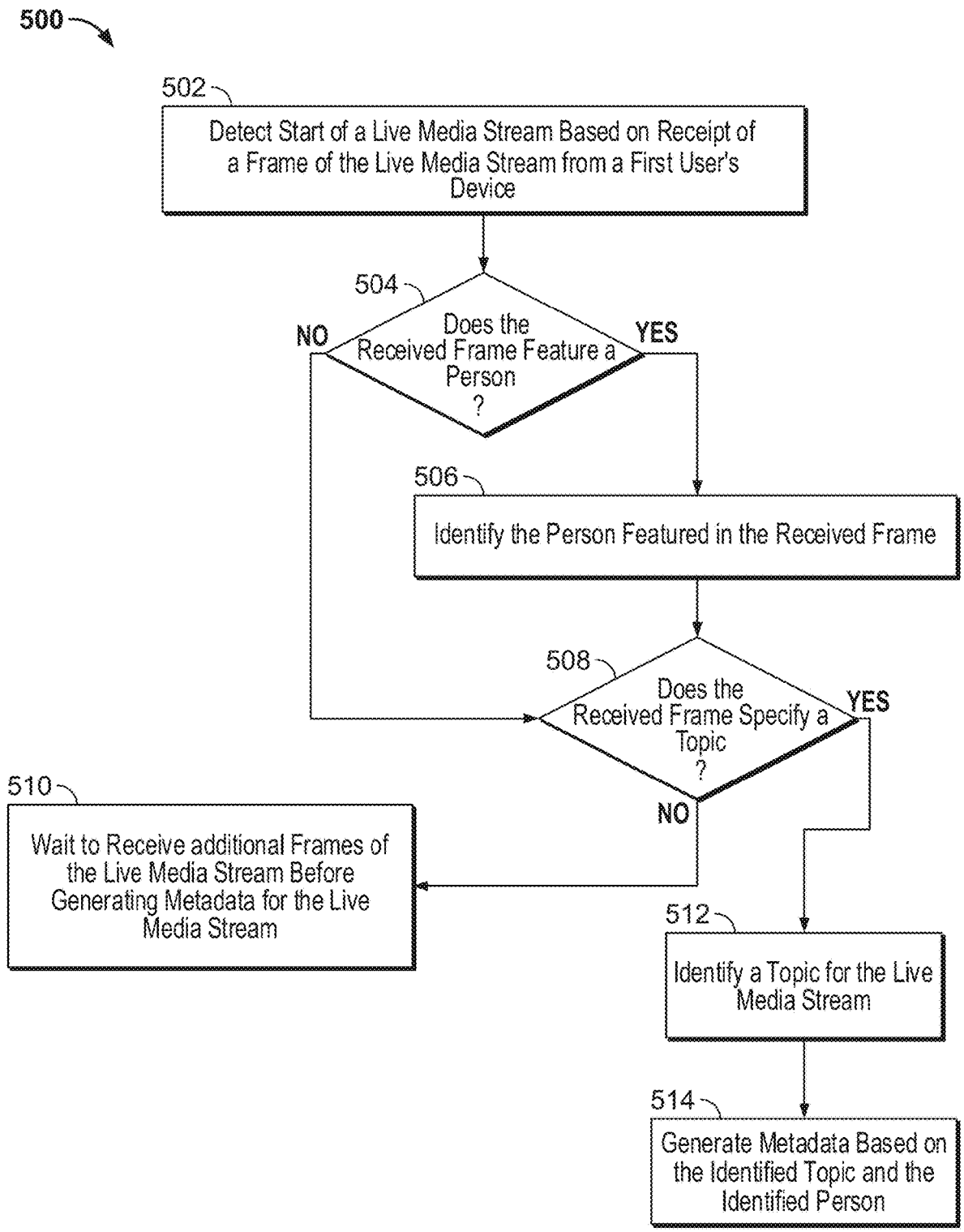
FIG. 5 is a flowchart of a detailed illustrative process for dynamically generating metadata for a live media stream, in accordance with some embodiments of this disclosure.

FIG. 5 is a flowchart of a detailed illustrative process for dynamically generating metadata for a live media stream, in accordance with some embodiments of this disclosure. In various embodiments, the individual steps of process 500 may be implemented by one or more components of the devices and systems of FIGS. 1-4. Although the present disclosure may describe certain steps of process 500 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 500 may be executed at content processing server 208 of FIG. 2.

At 502, content processing server 208 receives a frame (e.g., frame 206) of the live media stream from a first user's device (e.g., user equipment device 204) on a social media network (e.g., social media network 102). Specifically, the first user can begin a live media stream via a social media application using, for example, a camera on their mobile device (e.g., user equipment device 204) to capture video content. Content processing server 208 detects the start of the live media stream in response to receiving the frame of the live media stream. The received frame comprises an image and/or audio data transmitted by the first user which are retrieved by content processing server 208 for further analysis.

At 504, content processing server 208 determines whether the received frame features a person. For example, content processing server 208 uses facial recognition processor 212 to detect whether the retrieved image from the received frame includes a face of a person other than the first user. When content processing server 208 determines that the received frame does not feature a person other than the first user (NO at 504), process 500 proceeds to 508 discussed below. If, on the other hand, content processing server 208 determines that the received frame does feature a person other than the first user (YES at 504), process 500 proceeds to 506 and content processing server 208, using facial recognition processor 212, identifies the person featured in the received frame. In one example, facial recognition processor 212 compares the facial features of the person identified in the received frame to social connections of the first user on the social media network in order to identify the person featured in the received frame. Additional details of the processing by the facial recognition processor 212 will be described below in connection with the discussion of FIG. 6.

At 508, content processing server 208 determines whether the received frame specifies a topic for the live media stream. Specifically, content processing server 208 uses one or more of natural language processor 214, image processor 215, and data retrieved from memory 216 to determine whether the received frame specifies a topic for the live media stream. When content processing server 208 determines that the received frame does not specify a topic (NO at 508), process 500 proceeds to 510, where content processing server 208 waits to receive additional frames of the live media stream before generating metadata for the live media stream, in accordance with one embodiment described herein. In another embodiment, content processing server 208 generates metadata based only on the identity of the person other than the first user featured in the received frame when that information is available (YES at 504).

When, on the other hand, content processing server 208 determines that the received frame specifies a topic (YES at 508), process 500 proceeds to 512. At 512, content processing server 208 identifies a topic for the live media stream using one or more of natural language processor 214, image processor 215, and data retrieved from memory 216. For example, natural language processor 214 analyzes the audio data received from user equipment device 204. In an embodiment, content processing server 208 identifies a topic for the live media stream based on an output from natural language processor 214. For example, if natural language processor 214 determines that the first user uttered the phrase "Go Yankees," content processing server 208 identifies baseball as a candidate topic for the live media stream.

In one embodiment, image processor 215 analyzes the received frame to identify any geographic landmark (e.g., a baseball stadium). For example, image processor 215 can obtain a set of features of a building's architecture within the received frame (e.g., frame 206) and compare those features against publicly available images of various architecture to identify a match. In additional embodiments, image processor 215 can retrieve geographic location information and/or information about the time at which the live media stream was started. In one embodiment, the information about the geographic location and/or the time can be retrieved from the header of the received data packet from user equipment device 204. Content processing server 208 can then identify the topic for the live media stream based on the geographic location and/or time information related to the received frame.

In another embodiment, content processing server 208 can retrieve from memory 216 metadata for previous live media streams started by the first user to determine the topics frequently discussed by the first user during the prior live media streams, as will be described in greater detail below in connection with the discussion of FIG. 7.

At 514, content processing server 208 generates metadata based on the identified topic and the identified person. For example, content processing server 208 generates a title for the live media stream that provides information about the content of the live media stream (e.g., the determined topic at 512 and the identified person at 506). In other embodiments, the generated metadata can include the location from which the live media stream was started by the first user. In this way, systems and methods described herein dynamically generate metadata for a live media stream.

In an embodiment, the generated metadata for the live media stream is updated as additional frames of the live media stream are received. Content creators often discuss a variety of topic during a live media stream. Content processing server 208 can generate additional metadata and update the title of the live media stream as the topic of discussion during the live media stream changes over its duration. Similarly, content creators often hosy a number of guests during a live media stream. Content processing server 208 can generate additional metadata and update the title of the live media stream to include the name of the guests featured during different portions of the live media stream.

Figure 6:
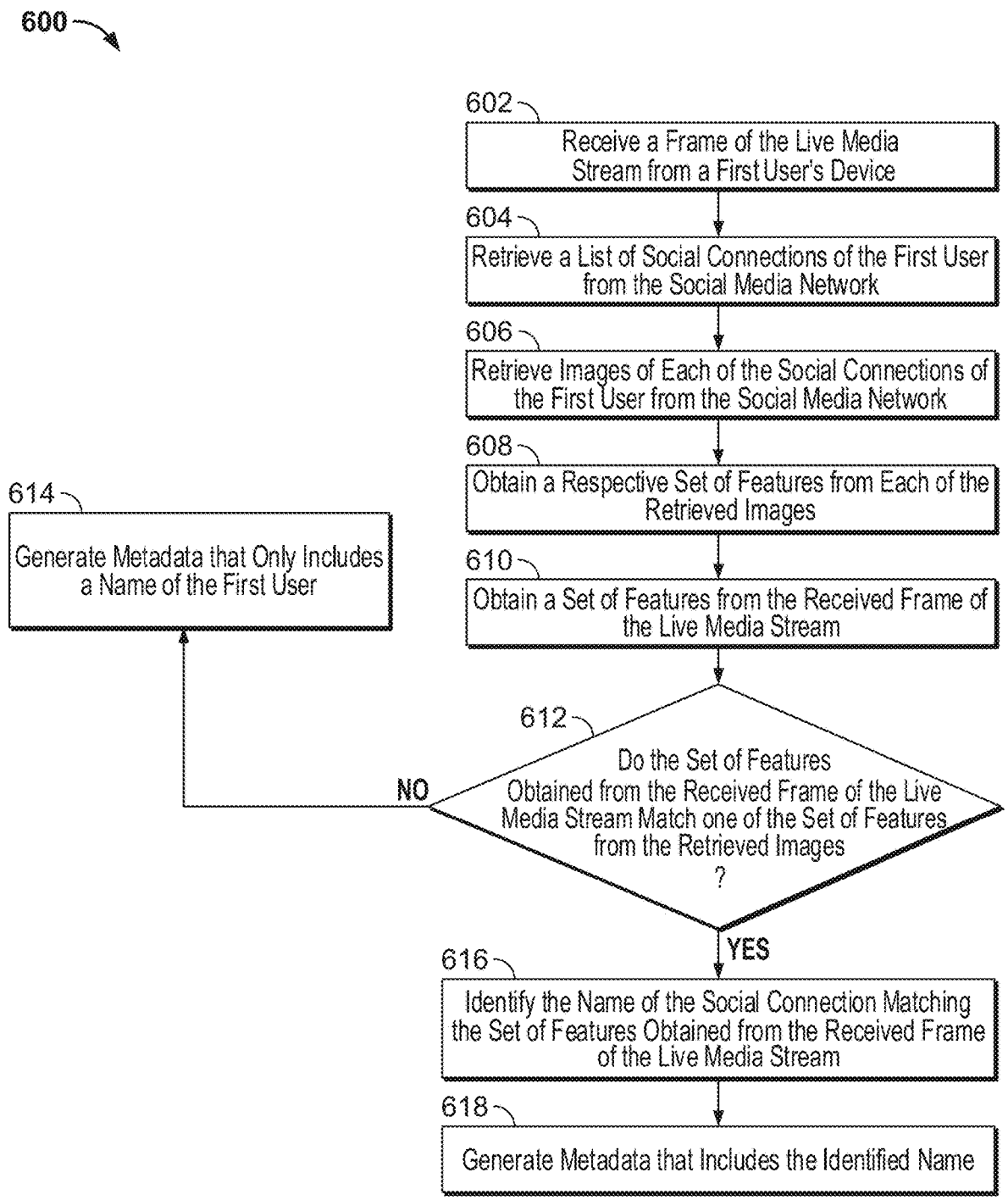
FIG. 6 shows a flowchart of a detailed illustrative process for identifying a person featured in a received frame of a live media stream started by a first user, in accordance with some embodiments of this disclosure.

FIG. 6 is a flowchart of a detailed illustrative process for identifying a person featured in a received frame of a live media stream started by a first user, in accordance with some embodiments of this disclosure. In various embodiments, the individual steps of process 600 may be implemented by one or more components of the devices and systems of FIGS. 1-4. Although the present disclosure may describe certain steps of process 600 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 600 may be executed at content processing server 208 of FIG. 2.

At 602, content processing server 208 receives a frame (e.g., frame 206) of the live media stream from a first user's device (e.g., user equipment device 204) on a social media network (e.g., social media network 102). Specifically, the first user can begin a live media stream via a social media application using, for example, a camera on their mobile device (e.g., user equipment device 204) to capture video content. The received frame comprises an image and/or audio data transmitted by the first user, which are retrieved by content processing server 208 for further analysis.

At 604, content processing server 208 retrieves a list of social connections of the first user from the social media network. As illustrated in FIG. 1, the list of social connections of the first user can be retrieved from a friends list 110 available from social media network 102. At 606, content processing server 208 retrieves images of each of the social connections of the first user from the social media network. For example, content processing server 208 can retrieve any images available on the social media network in which a social connection of the first user is tagged.

At 608, content processing server 208 obtains a respective set of features from each of the retrieved images. Specifically, facial recognition processor 212 analyzes each of the retrieved images to identify characteristics of each of the faces of the social connections of the first user. For example, the identified characteristics may be one or more of a size of a forehead, a distance between the bridge of a nose and the upper lip, a width of the lips, and a distance between the eyes of each of the faces of the social connections of the first user.

At 610, content processing server 208, using facial recognition processor 212, identifies similar characteristics for a face included in the received frame of the live media stream. At 612, content processing server 208 compares the identified characteristics for the face included in the received frame of the live media stream to the identified characteristics of each of the faces of the social connections of the first user. If a match is not found (NO at 612), process 600 proceeds to 614, where content processing server 208 generates metadata for the live media stream that only includes the name of the first user.

If a match is found (YES at 612), process 600 proceeds to 616, where content processing server 208 identifies a name of the social connection having the identified characteristics matching the set of features obtained from the received frame of the live media stream. As illustrated in FIG. 1, a social connection named "Mike Bolz" is identified as the person other than the first user being featured in the live media stream.

At 618, content processing server 208 generates metadata that includes the name of the person other than the first user featured in the received frame of the live media stream. For example, content processing server 208 generates a title that includes the name of the identified social connection for the live media stream started by the first user. The generated metadata (e.g., the title) is then transmitted to other users on the social media network who are determined to be interested in the determined likely topic. In this way, the system ensures that the users of the social media network who are interested in the identified social connection (e.g., other social connections of the identified social connection "Mike Bolz") are notified of the live media stream, thereby increasing the viewership for the live media stream.

Although the above description describes retrieving a list of social connections of the first user from the social media network, in some embodiments, content processing server 208 can search through additional databases to retrieve facial data. For example, in one embodiment, content processing server 208 can retrieve facial data for celebrities who are determined to be in the vicinity of the first user when the live media stream was started (e.g., celebrities attending the same baseball game), based on data available from the social media network. In this way, upon finding a match between the celebrity image and the facial data retrieved from the received frame of the live media stream, the generated metadata can include the name of the celebrity, thereby increasing the viewership for the live media content.

Figure 7:
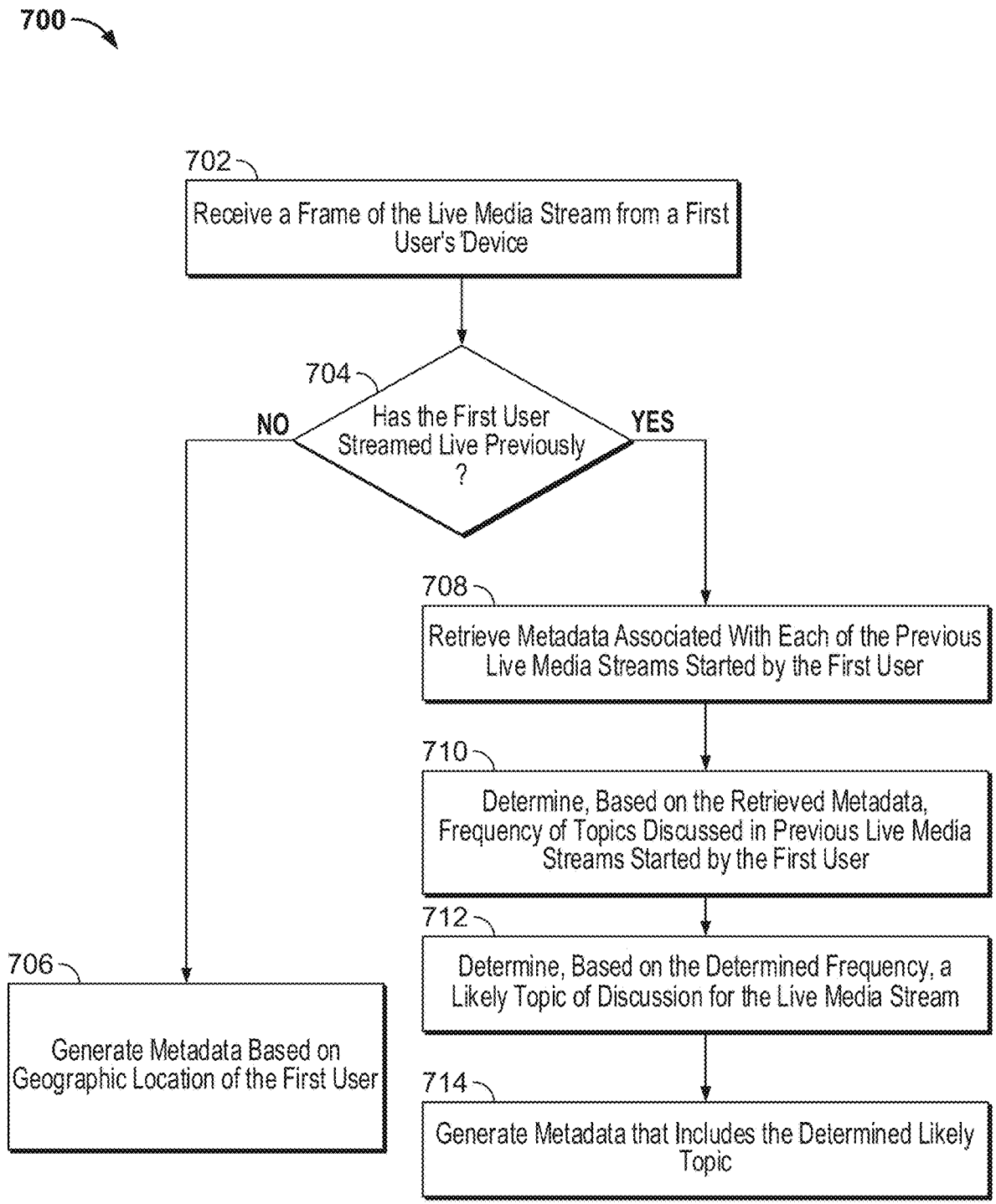
FIG. 7 is a flowchart of a detailed illustrative process for identifying a topic of discussion of the live media stream, in accordance with some embodiments of this disclosure.

FIG. 7 is a flowchart of a detailed illustrative process for a topic of discussion of the live media stream, in accordance with some embodiments of this disclosure. In various embodiments, the individual steps of process 700 may be implemented by one or more components of the devices and systems of FIGS. 1-4. Although the present disclosure may describe certain steps of process 700 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 800 may be executed at content processing server 208 of FIG. 2.

At 702, content processing server 208 receives a frame (e.g., frame 206) of the live media stream from a first user's device (e.g., user equipment device 204) on a social media network (e.g., social media network 102). Specifically, the first user can begin a live media stream via a social media application using, for example, a camera on their mobile device (e.g., user equipment device 204) to capture video content. The received frame comprises an image and/or audio data transmitted by the first user, which are retrieved by content processing server 208 for further analysis.

At 704, content processing server 208 determines whether the first user has streamed live previously. For example, content processing server 208 retrieves, from memory 216, a history of previously streamed content by the first user. If content processing server 208 determines that the first user has not previously streamed live before (NO at 704), process 700 proceeds to 706. At 706, content processing server 208 generates metadata about the topic of discussion for the live media stream based only on the geographic location of the first user at the time when the live media stream was started.

If, on the other hand, content processing server 208 determines that the first user has previously streamed live before (YES at 704), process 700 proceeds to 708. At 708, content processing server 208 retrieves metadata associated with each of the previous live media streams started by the first user. For example, content processing server 208 retrieves a plurality of audience comments that may have been posted in connection with previous live media streams started by the first user, in accordance with one embodiment. Content processing server 208 can then determine a topic of discussion for those live media streams based on the retrieved comments. In another embodiment, content processing server 208 retrieves metadata added by the first user after the end of the previous live media streams. Specifically, various social media networks allow content creators to edit the titles of their previous live media streams or add a description after the end of the newly created live media stream. In an embodiment, content processing server 208 gives greater weight to metadata provided by the first user during prior live media streams than a weight given to audience comments.

At 710, content processing server 208 determines, based on the retrieved metadata, a frequency of topics discussed in previous live media streams started by the first user. For example, content processing server 208 can determine that the first user Adam frequently discusses baseball games on his live media streams. In an embodiment, content processing server 208 can correlate additional metadata about the previous live media streams such as the geographic location (e.g., baseball stadiums) and times at which the previous live media streams were started (e.g., end of baseball games) to provide additional context around the determined topic for the previous live media streams started by the first user.

In one embodiment, content processing server 208 retrieves subtitle data, when available, from previous live media streams started by the first user to identify the topic of discussion for the previous live media streams. Specifically, the subtitle data can be analyzed to determine a frequency of specific words, phrases, or entities discussed during the previous live media streams to identify the topic of discussion for the previous live media streams. In other embodiments, content processing server 208 retrieves audio data for the previous live media streams started by the first user, which are then analyzed by natural language processor 214 to identify the topic of discussion for the previous live media streams.

At 712, content processing server 208 determines, based on the frequency of topics discussed during previous live media streams, a likely topic of discussion for the live media stream. In an embodiment, content processing server 208 compares metadata available from the received frame of the current live media stream (e.g., geographic location, geographic landmark, time, etc.) to metadata retrieved from previous live media streams started by the first user to identify a match. Based on the identified match, content processing server 208 determines the likely topic of discussion for the current live media stream.

At 714, content processing server 208 generates metadata that includes the determined likely topic. For example, content processing server 208 generates a title that includes the topic of discussion for the live media stream started by the first user. The generated metadata (e.g., the title) is then transmitted to other users on the social media network who are determined to be interested in the determined likely topic. In this way, the system ensures that the users of the social media network who are interested in the determined topic (e.g., Yankees fans) are notified of the live media stream, thereby increasing the viewership for the live media stream.

Figure 8:
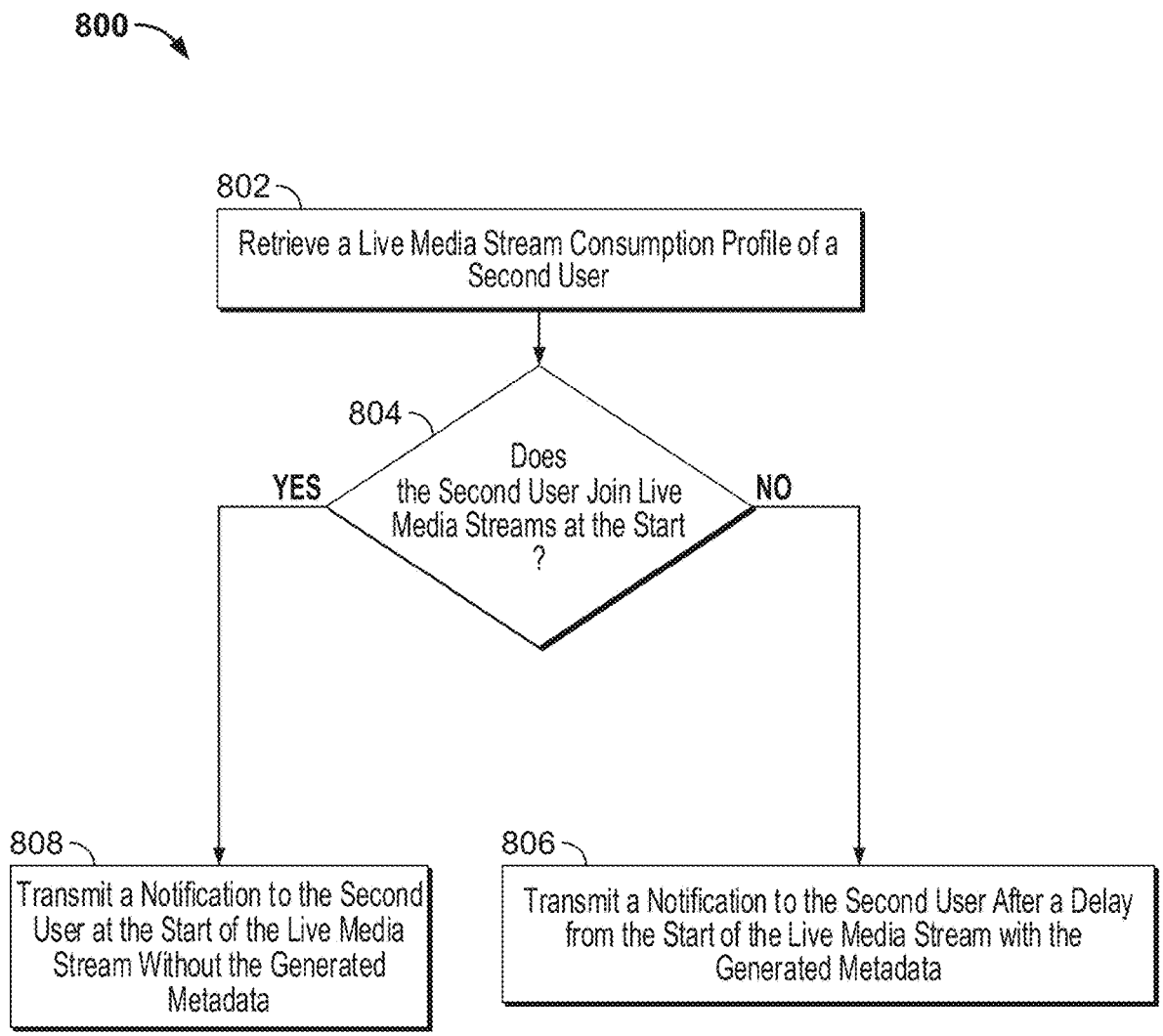
FIG. 8 is a flowchart of a detailed illustrative process for determining when to notify a second user of the start of the live media stream, in accordance with some embodiments of this disclosure.

FIG. 8 is a flowchart of a detailed illustrative process for determining when to notify a second user of the start of the live media stream, in accordance with some embodiments of this disclosure. In various embodiments, the individual steps of process 800 may be implemented by one or more components of the devices and systems of FIGS. 1-4. Although the present disclosure may describe certain steps of process 600 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 800 may be executed at content processing server 208 of FIG. 2.

At 802, content processing server 208 retrieves a live media stream consumption profile of a second user on the social media network. For example, content processing server 208 retrieves, from memory 216, the second user's viewing history for all live media streams on the social media network. In other embodiments, content processing server 208 retrieves, from memory 216, the second user's viewing history for live media streams that were provided by the first user on the social media network.

At 804, content processing server 208 determines whether the second user joins live streams at the start or after a delay. For example, content processing server 208 can determine an average time after the start of a live media stream at which the second user has joined previous live media streams. In one embodiment, content processing server 208 can compare the determined average time to a threshold (e.g., five minutes) to determine whether the second user joins live streams at the start or after a delay.

When it is determined that the second user has historically joined live media streams after a delay from the start (NO at 804), process 800 proceeds to 806, where content processing server 208 transmits a notification to the second user after a delay from the start of the live media stream where the notification includes the generated metadata. Specifically, content processing server 208 can leverage the fact that the second user is unlikely to be deterred from viewing the live media stream based on a delay in receiving the notification of the start of live media stream, and wait to receive additional frames of the live media stream to generate more accurate metadata for the notification. This allows the system to provide more accurate information about the content of the live media stream as the metadata is generated based on additional frames of the live media stream. In one embodiment, content processing server 208 waits for a threshold period of time (e.g., two minutes) before transmitting the notification.

If, on the other hand, it is determined that the second user has historically joined live media streams from the start of the live media stream (YES at 804), process 800 proceeds to 808, where content processing server 208 transmits a notification to the second user immediately at the start of the live media stream without including the generated metadata. For example, if content processing server 208 determines, at 804, that the second user enjoys interacting in the live media stream (e.g., by asking questions to the first user or posting comments), content processing server 208 prioritizes expediency of transmitting the notification over accuracy of the information included in the notification. For example, in one embodiment, content processing server 208 transmits a notification to the second user at 808 that only includes information about the geographic location from which the live media stream was started (e.g., "Adam is streaming live from Yankee Stadium). In this way, content processing server 208 can provide a suitable notification based on viewing history of a second user on the social media network.

Figure 9:
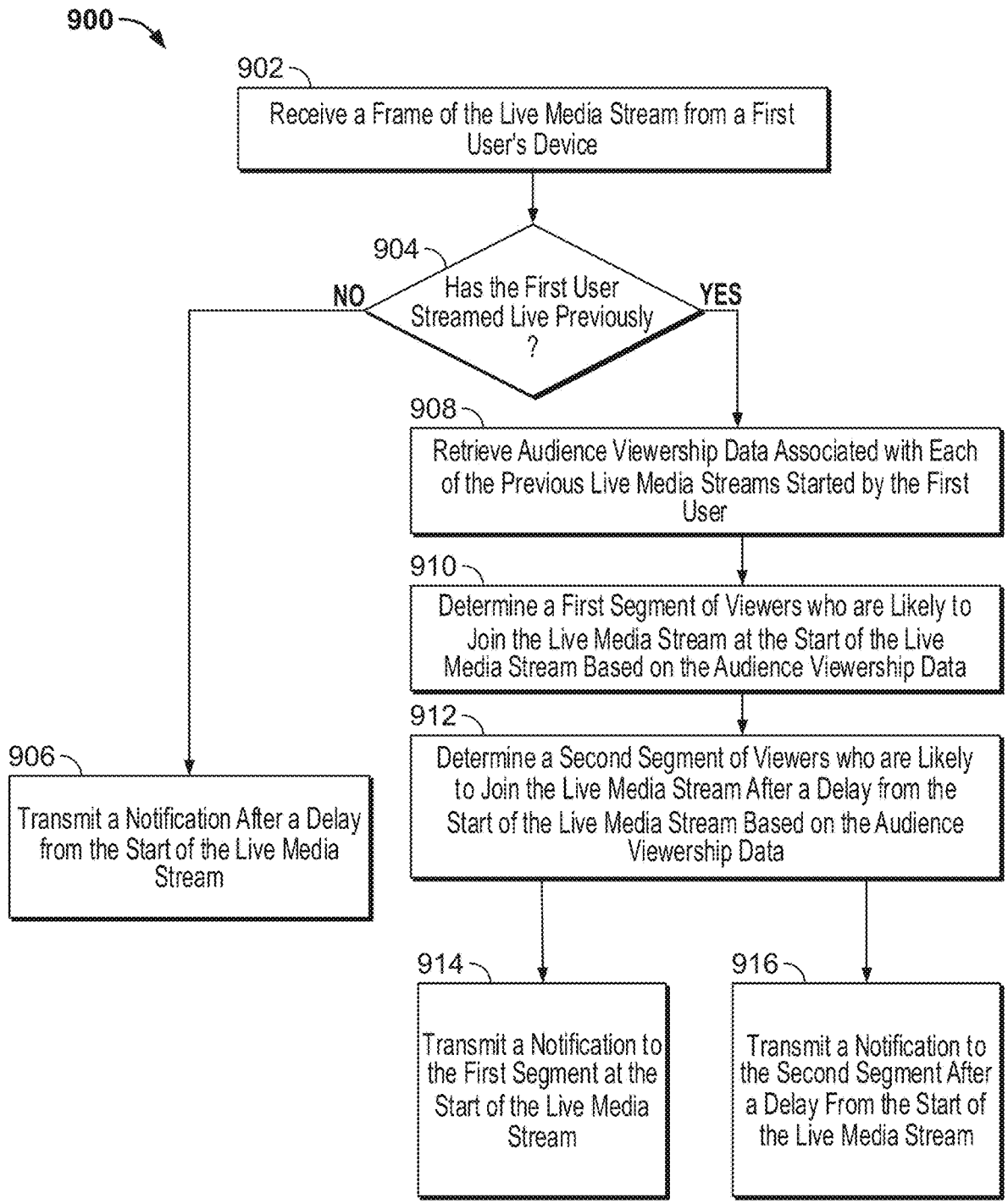
FIG. 9 is a flowchart of a detailed illustrative process for segmenting a likely audience for a live media stream started by a first user, in accordance with some embodiments of this disclosure.

FIG. 9 is a flowchart of a detailed illustrative process for segmenting a likely audience for a live media stream started by a first user, in accordance with some embodiments of this disclosure. In various embodiments, the individual steps of process 900 may be implemented by one or more components of the devices and systems of FIGS. 1-4. Although the present disclosure may describe certain steps of process 900 (and of other processes described herein) as being implemented by certain components of the devices and systems of FIGS. 1-4, this is for purposes of illustration only, and it should be understood that other components of the devices and systems of FIGS. 1-4 may implement those steps instead. For example, the steps of process 600 may be executed at content processing server 208 of FIG. 2.

At 902, content processing server 208 receives a frame (e.g., frame 206) of the live media stream from a first user's device (e.g., user equipment device 204) on a social media network (e.g., social media network 102). Specifically, the first user can begin a live media stream via a social media application using, for example, a camera on their mobile device (e.g., user equipment device 204) to capture video content. The received frame comprises an image and/or audio data transmitted by the first user, which are retrieved by content processing server 208 for further analysis.

At 904, content processing server 208 determines whether the first user has previously streamed live content. For example, content processing server 208 retrieves, from memory 216, a history of previously streamed content by the first user. If content processing server 208 determines that the first user has not previously streamed live before (NO at 904), process 900 proceeds to 906. At 906, content processing server 208 waits to receive additional frames of the live media stream before generating metadata for the live media stream. Moreover, at 906, a notification is transmitted to social connections of the first user after a delay from the start of the live media stream where the notification includes the generated metadata.

If, on the other hand, content processing server 208 determines that the first user has previously streamed live before (YES at 904), process 900 proceeds to 908. At 908, content processing server 208 retrieves, from memory 216, audience viewership data associated with each of the previous live media streams started by the first user. More specifically, content processing server 208 retrieves information about an average time after the start of the previous live streams that each of the viewers of those previous live media streams joined.

At 910, content processing server 208 determines a first segment of viewers who are likely to join the current live media stream at the start of the live media stream based on the audience viewership data. For example, content processing server 208 identifies viewers of previous live media streams who joined those previous live media streams within a threshold period of time after the start of those live media streams (e.g., five minutes) as belonging to the first segment of viewers.

Similarly, at 912, content processing server 208 determines a second segment of viewers who are likely to join the current live media stream after a delay from the start of the live media stream based on the audience viewership data. For example, content processing server 208 identifies viewers of previous live media streams who joined those previous live media streams after the threshold period of time after the start of those live media streams (e.g., five minutes) as belonging to the second segment of viewers.

At 914, content processing server 208 transmits a notification to the first segment of viewers at the start of the live media stream. Specifically, content processing server 208 prioritizes expediency over accuracy when generating metadata for users belonging in the first segment of viewers based on their viewership behavior during past live media streams started by the first user. The notification transmitted to viewers in the first segment therefore includes less information (see, e.g., notifications received on user equipment device 224) than notification transmitted to users in the second segment (see, e.g., notifications received on user equipment devices 220, 222).

At 916, content processing server 208 transmits a notification to the second segment after a delay from the start of the live media stream. Specifically, users of the social media network determined to be in the second segment of viewers do not need to be notified of the start of live media stream immediately as they are less likely to watch the live media stream at the start time. Content processing server 208 leverages this data and waits to generate metadata until additional frames of the live media stream are received from user equipment device 204 in order to generate more accurate metadata. In some embodiments, content processing server 208 transmits a notification to the second segment after a five-minute delay from the start of the live media stream. In this way, systems and methods described herein provide suitable notifications to the likely viewers of the live media stream in order to maximize the total viewership of the live media stream and make it easier for users of the social media network to find the live media stream using the generated metadata.

The processes described above are intended to be illustrative and not limiting. One skilled in the art would appreciate that the steps of the processes discussed herein may be related causally (i.e., in response), omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    determining that a first user on a social media network has started a live media stream;
    identifying a topic of the live media stream based on a frame of the live media stream;
    generating a title for the live media stream based on the identified topic;
    determining, based on a live media consumption history of a second user, an average time when the second user joins live media streams after the start;
    determining, based on the determined average time, a likelihood of the second user joining the live media stream after the start of the live media stream that the second user is likely to join at a time after the start of the live media stream; and
    in response to the determining that the second user is likely to join the live media stream at a time after the start of the live stream:
    delaying a transmitting of the notification until an additional frame of the live media stream has been received from the first user;
    transmitting the notification to the second user after the additional frame of the live media stream has been received, wherein the generating of the title is based on the additional frame;
    determining, based on a live media consumption profile of a third user, that the third user is likely to join the live media stream immediately at the start of the live media stream;
    in response to determining that the third user is likely to join the live media stream immediately at the beginning of the live stream, transmitting the notification to the third user without the generated title immediately upon the start of the live media stream.

2. The method of claim 1, further comprising:
    retrieving viewing statistics associated with prior live media streams started by the first user;
    determining a first segment of viewers who are likely to join the live media stream at the start of the live media stream based on the retrieved viewing statistics; and
    determining a second segment of viewers who are likely to join the live media stream after a delay from the start of the live media stream based on the retrieved viewing statistics.

3. The method of claim 2, further comprising:
    transmitting the notification to the first segment of viewers at the start of the live media stream, wherein the notification does not include the generated title; and
    transmitting the notification to the second segment of viewers after a delay from the start of the live media stream, wherein the notification includes the generated title.

4. The method of claim 1, wherein the identifying of the second user featured in the frame of the live media stream comprises:
retrieving images of each of the social connections of the first user in the social media network;
obtaining a respective set of features from each of the retrieved images of each of the social connections of the first user;
identifying a face from the received frame of the live media stream; and
comparing the identified face from the received frame of the live media stream to each of the obtained set of features to identify the second user featured in the live media stream.

5. The method of claim 1, wherein identifying the topic of the live media stream based on a frame of the live media stream comprises:
retrieving metadata associated with prior live media streams started by the first user, wherein the metadata includes subtitle data; and
determining the topic of the live media stream based on an analysis of the retrieved subtitle data.

6. The method of claim 1, further comprising:
intermittently updating the title of the live media stream based on receipt of additional frames of the live media stream.

7. The method of claim 1, wherein generating a title for the live media stream based on the identified topic and the identified user comprises:
combining the identified topic and the identified user.

8. A system comprising:
control circuitry configured:
to determine that a first user on a social media network has started a live media stream;
to identify a topic of the live media stream based on a frame of the live media stream;
to generate a title for the live media stream based on the identified topic;
to determine, based on a live media consumption history of a second user, an average time when the second user joins live media streams after the start;
to determine, based on the determined average time, a likelihood of the second user joining the live media stream after the start of the live media stream that the second user is likely to join at a time after the start of the live media stream; and
in response to the determining that the second user is likely to join the live media stream at a time after the start of the live stream: to delay transmitting of the notification until an additional frame of the live media stream has been received from the first user; and
to determine, based on a live media consumption profile of a third user, that the third user is likely to join the live media stream immediately at the start of the live media stream; and
communication circuitry configured:
to transmit the notification to the second user after the additional frame of the live media stream has been received, wherein the generating of the title is based on the additional frame; and
in response to determining that the third user is likely to join the live media stream immediately at the beginning of the live stream, to transmit the notification to the third user without the generated title immediately upon the start of the live media stream.

9. The system of claim 8, wherein the control circuitry is further configured to:
retrieve viewing statistics associated with prior live media streams started by the first user;
determine a first segment of viewers who are likely to join the live media stream at the start of the live media stream based on the retrieved viewing statistics; and
determine a second segment of viewers who are likely to join the live media stream after a delay from the start of the live media stream based on the retrieved viewing statistics.

10. The system of claim 9, wherein the transceiver is further configured to:
transmit the notification to the first segment of viewers at the start of the live media stream, wherein the notification does not include the generated title; and
transmit the notification to the second segment of viewers after a delay from the start of the live media stream, wherein the notification includes the generated title.

11. The system of claim 8, wherein the control circuitry, when identifying the second user featured in the frame of the live media stream based on social connections of the first user in the social media network, is further configured to:
retrieve images of each of the social connections of the first user in the social media network;
obtain a respective set of features from each of the retrieved images of each of the social connections of the first user;
identify a face from the received frame of the live media stream; and
compare the identified face from the received frame of the live media stream to each of the obtained set of features to identify the second user featured in the live media stream.

12. The system of claim 8, wherein the control circuitry, when identifying the topic of the live media stream based on a frame of the live media stream, is further configured to:
retrieve metadata associated with prior live media streams started by the first user, wherein the metadata includes subtitle data; and
determine the topic of the live media stream based on an analysis of the retrieved subtitle data.

13. The system of claim 8, wherein the control circuitry is further configured to:
intermittently update the title of the live media stream based on receipt of additional frames of the live media stream.

14. The system of claim 8, wherein the control circuitry, when generating a title for the live media stream based on the identified topic and the identified user, is further configured to:
combine the identified topic and the identified user.

15. The method of claim 1, wherein the generating of the title for the live media stream is based on the identified topic and the identified second user.

* * * * *